(12) United States Patent
Corley, Jr.

(10) Patent No.: US 7,222,922 B2
(45) Date of Patent: May 29, 2007

(54) THREE-STATE MAGNET VALVE

(75) Inventor: Leon W. Corley, Jr., Columbia, SC (US)

(73) Assignee: Wabtec Holding Corporation, Wilmerding, PA (US)

( * ) Notice: Subject to any disclaimer, the term of this patent is extended or adjusted under 35 U.S.C. 154(b) by 112 days.

(21) Appl. No.: 11/107,357

(22) Filed: Apr. 15, 2005

(65) Prior Publication Data

US 2005/0236893 A1 Oct. 27, 2005

Related U.S. Application Data

(63) Continuation-in-part of application No. 10/338,100, filed on Jan. 7, 2003, now abandoned.

(51) Int. Cl.
*B60T 8/36* (2006.01)

(52) U.S. Cl. .................................. 303/119.2

(58) Field of Classification Search ............. 303/118.1, 303/119.2; 137/596.16–596.17
See application file for complete search history.

(56) References Cited

U.S. PATENT DOCUMENTS

| | | | | |
|---|---|---|---|---|
| 3,844,623 | A | * | 10/1974 | Parsons et al. .......... 303/119.2 |
| 5,123,718 | A | * | 6/1992 | Tyler ....................... 303/118.1 |
| 6,520,599 | B2 | * | 2/2003 | Wood et al. ............... 303/22.4 |
| 6,746,087 | B1 | * | 6/2004 | Reynolds et al. ............. 303/15 |
| 7,020,551 | B2 | * | 3/2006 | Goebels et al. ............... 701/38 |
| 2004/0130207 | A1 | * | 7/2004 | Corley, Jr. ............... 303/119.2 |

* cited by examiner

*Primary Examiner*—Christopher P. Schwartz
(74) *Attorney, Agent, or Firm*—The Webb Law Firm

(57) ABSTRACT

A three-state magnet valve for control of fluid flow from a source of fluid pressure. The three-state magnet valve has an application pilot solenoid electrically connectable to a control module, and an application valve for connecting the source of fluid pressure and to a braking device. The three-state magnet valve further has a release pilot solenoid valve electrically connectable to a control module, and a release valve to exhaust the braking device. The valves are interconnected and controlled so that source pressure can never be passed to exhaust.

7 Claims, 3 Drawing Sheets

THREE-STATE MAGNET VALVE

FIELD OF THE INVENTION

The present invention generally relates to a fluid control valve. More particularly, the invention relates to a fluid control valve that comprises solenoid-operated pilot valves and fluid-operated valves to achieve three states of operation.

BACKGROUND OF THE INVENTION

An ANSI schematic of the operation of the prior art R-10 magnet valve is given in FIG. 2. The R-10 magnet valve described below is manufactured and sold by Westinghouse Air Brake Technologies Corporation. The R-10 magnet valve consists of two two-way Air Flow Management Valves, one three-way Application Pilot Valve, and one three-way Release Pilot Valve. The operation cycle of the R-10 magnet valve is described below.

When the pilot valves are deenergized, a supply pressure from the reservoir enters the unit and pilots the application valve open, and the supply pressure flows to a brake cylinder.

When the application pilot is energized, thereby restricting the application valve to the choked port, the brake cylinder pressure is sustained.

When the release pilot is energized, the release pilot pressure is exhausted and the release valve is forced open by the brake cylinder pressure. The choked supply port flows to exhaust also.

When the application pilot is deenergized and while the release pilot remains energized, the application pilot pressure is exhausted and the application valve opens. This allows the supply pressure to flow unrestricted through the exhaust port.

An ANSI schematic of the operation of the prior art N-7-D Magnet Valve is given in FIG. 3. The N-7-D magnet valve described below is also manufactured and sold by Westinghouse Air Brake Technologies Corporation. The N-7-D magnet valve consists of one two-way Air Flow Management Valve, one three-way Air Flow Management Valve, one three-way Application Pilot Valve, and one three-way Release Pilot Valve. The operation cycle of the N-7-D Magnet Valve is described below.

With the pilot valve deenergized, a supply pressure flows directly into the brake cylinder from the reservoir. Pilot pressure is supplied independently.

With the application pilot energized, it closes the supply pressure off from the brake cylinder and brake cylinder pressure exhausts.

With the release pilot energized, the exhaust port is closed off from the brake cylinder, thus holding brake cylinder pressure constant.

With the application pilot deenergized while the release pilot remains energized, the application pilot pressure is exhausted, causing the application valve to close off exhaust from the brake cylinder, thus allowing supply pressure to flow to the brake cylinder.

SUMMARY OF THE INVENTION

In one aspect, the invention generally features a three-state magnet valve for control of fluid flow. The three-state magnet valve has ports engageable with a source of fluid pressure for connecting the three-state magnet valve to a source of fluid pressure. The three-state magnet valve also has an application pilot solenoid valve having a fluid connection to a source of fluid pressure and is electrically connectable to a control module. The three-state magnet valve further has an application valve having a fluid connection to a source of fluid pressure and to an application pilot solenoid valve and a braking device. The application pilot solenoid valve is also electrically connectable to a control module. The application valve is able to initiate a braking application upon receipt of a fluid signal from the application pilot solenoid valve resulting from an electrical signal from a control module to the application pilot valve. The three-state magnet valve further has a release pilot solenoid valve having a fluid connection to a source of fluid pressure and to the application valve and is electrically connectable to a control module. The three-state magnet valve also has a release valve having a fluid connection to an exhaust to atmosphere and to the application valve and to the release pilot solenoid valve and to a braking device. The release pilot solenoid valve is electrically connectable to a control module. The release valve is able to exhaust fluid pressure to atmosphere upon receipt of a fluid pressure signal from the release pilot solenoid valve resulting from an electrical signal from the control module to the release pilot valve thereby exhausting fluid pressure from the braking device.

In another aspect, the invention generally features a method for wheel slip control using a three-state magnet valve. The method is comprised of the steps of generating a signal in a control module and giving a command signal to at least one of a plurality of solenoid valves that allows a source pressure to be applied to or exhausted from or held stable at a braking device based on the signal generated.

OBJECTS OF THE INVENTION

It is, therefore, one of the primary objects of the present invention to provide a three-state magnet valve consisting of two two-way valves without the possible failure mode of venting the supply and delivery to exhaust.

It is, therefore, another object of the present invention to provide a three-state magnet valve that allows the release pilot valve to have two functions.

It is, therefore, yet another object of the present invention to provide a three-state magnet valve that allows the release pilot valve to release brake cylinder pressure to exhaust.

It is, therefore, still a further object of the present invention to provide a three-state magnet valve that offers an override that closes the application valve regardless of the state of the application pilot solenoid valve, eliminating the possibility of venting the supply pressure to exhaust unintentionally.

It is, therefore, even another object of the present invention to provide a three-state magnet valve that is designed to retain the simplicity, size, and cost of using two two-way valves while adding value to its function.

In addition to the above-described objects and advantages of the three-state magnet valve, various other objects and advantages of the present invention will become more readily apparent to the persons who are skilled in the same and related arts from the following more detailed description of the invention, particularly, when such description is taken in connection with the attached drawing figures and the appended claims.

DESCRIPTION OF THE PREFERRED EMBODIMENTS

Figure 1:
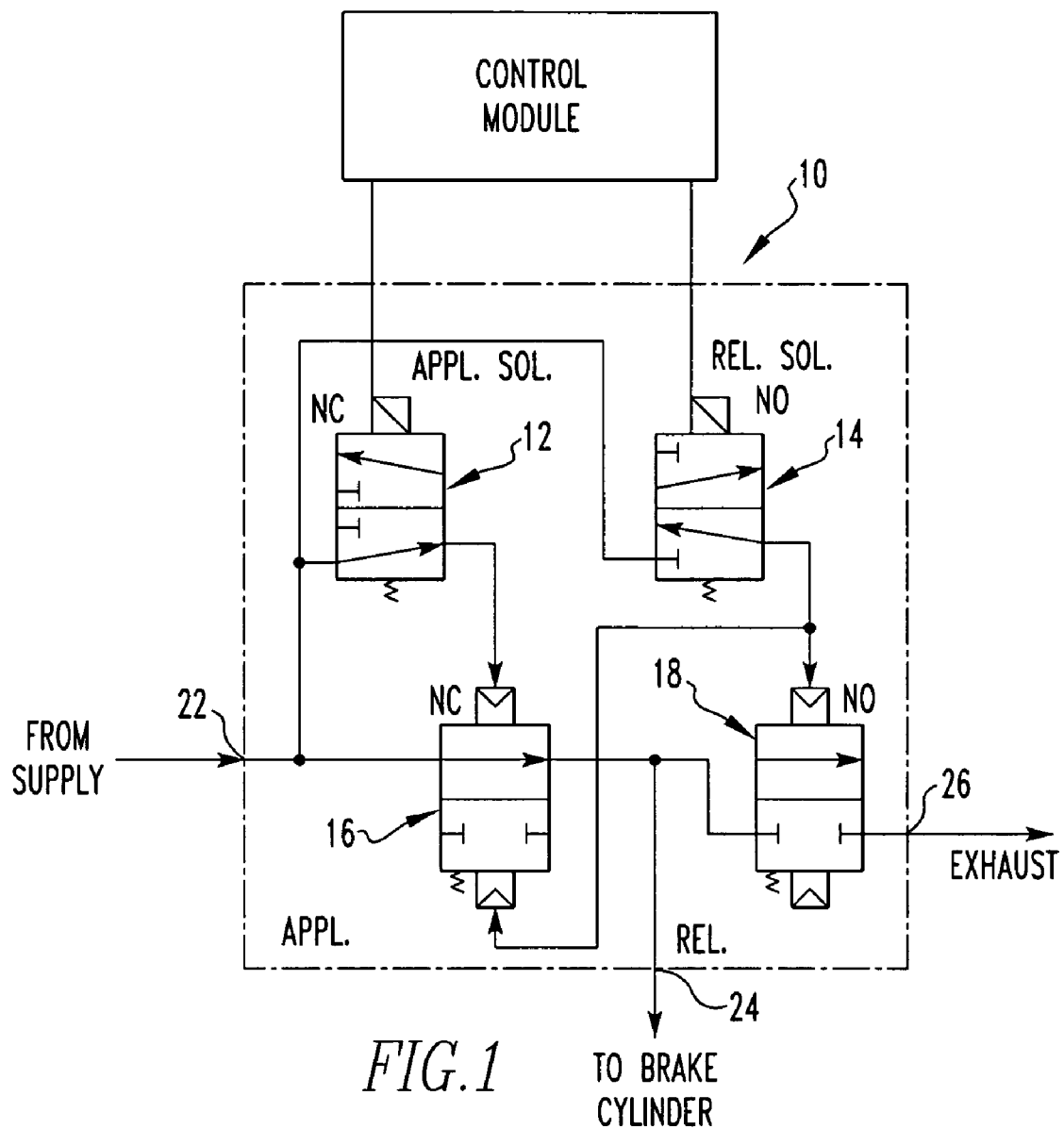
FIG. 1 is an ANSI schematic of the operation of one embodiment of the present invention.
Figure 2:
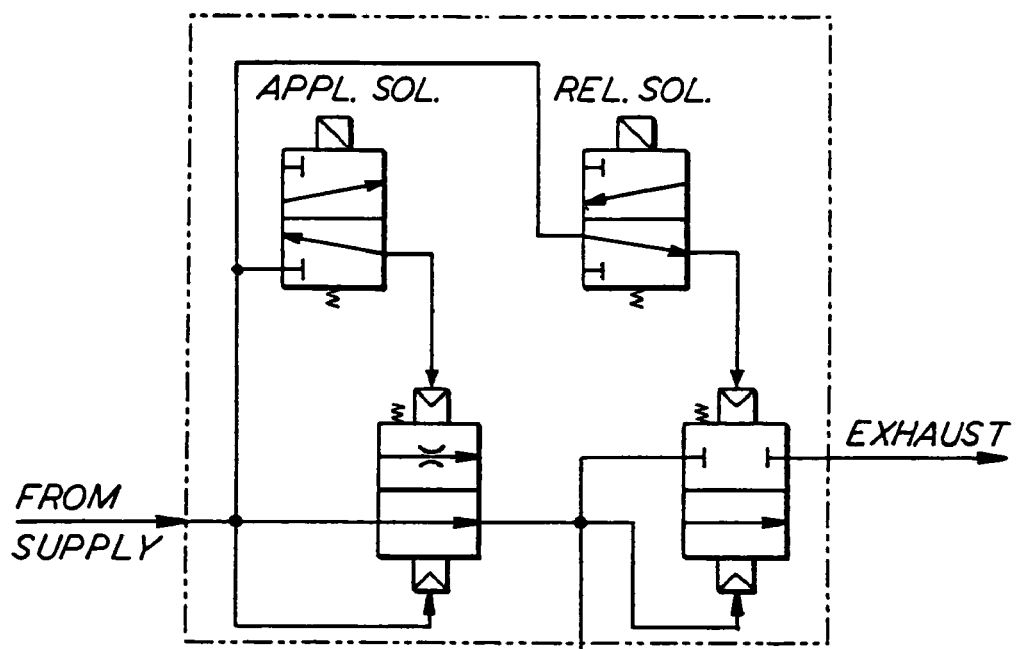
FIG. 2 is an ASNI schematic of the operation of the prior art R-10 Magnet Valve.
Figure 3:
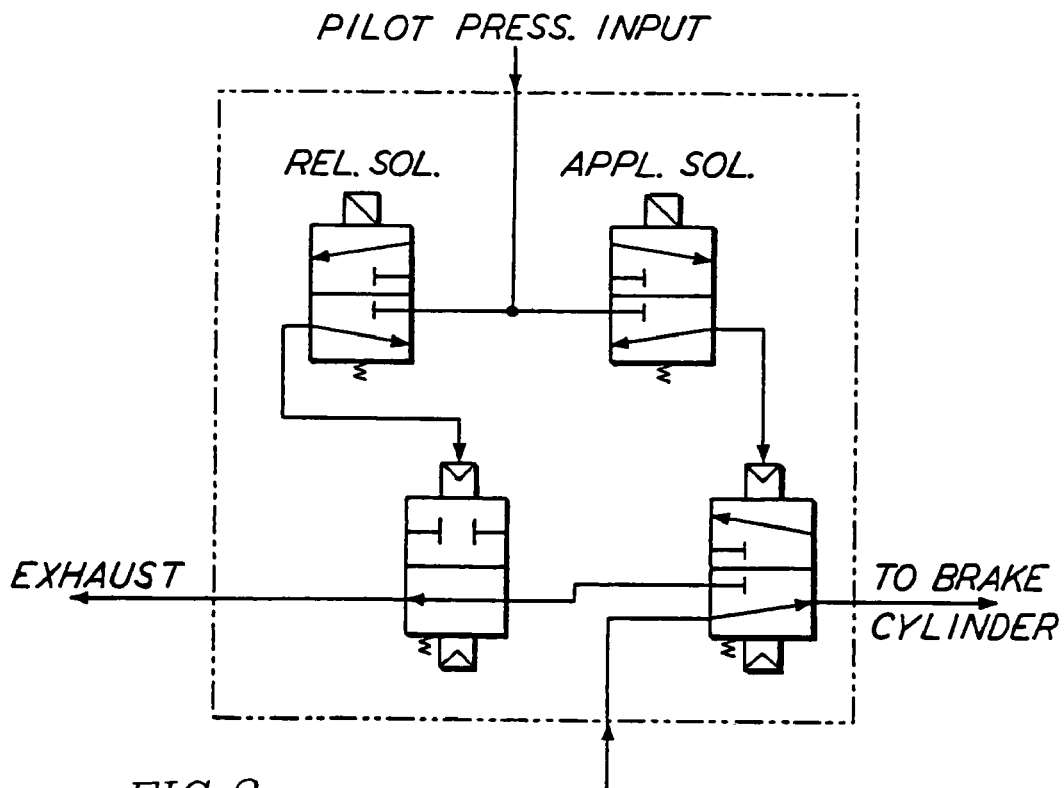
FIG. 3 is an ANSI schematic of the operation of the prior art N-7-D Magnet Valve.

Prior to proceeding to a much more detailed description of the presently preferred embodiment, it should be noted that identical components which have identical functions have been identified with identical reference numerals throughout the several views illustrated in the drawing figures for the sake of clarity and understanding of the invention.

Referring initially to FIG. 1, a three-state magnet valve constructed according to the present invention is generally indicated by reference numeral 10. The three-state magnet valve 10 generally includes an application pilot solenoid valve 12, a release pilot solenoid valve 14, an application valve 16, a release valve 18, a port engageable with a source of fluid supply 22, a fluid connection 24 to a braking device, and an exhaust to atmosphere 26.

An ANSI schematic of the operation of the present invention is produced in FIG. 1 for reference. The three-state magnet valve 10 of the present invention consists of ports 22 engageable with a source of fluid pressure 22 for connecting the three-state magnet valve to the source of fluid pressure.

The application pilot solenoid valve 12 has a fluid connection to the source of fluid pressure and is electrically connectable to a control module (not shown), the application pilot solenoid valve preferably being of the three-way normally closed type.

The application valve 16 has a fluid connection to the source of fluid pressure, to the application pilot solenoid valve 12, and to a braking device (preferably a brake cylinder, not shown). The application valve 16 is preferably of the two-way normally closed type. The application valve 16 is able to initiate a braking application by allowing source pressure to be transmitted to a fluid connection 24 to a braking device upon receipt of a fluid signal from the application pilot solenoid valve 12 resulting from an electrical signal from a control module to the application pilot valve.

The release pilot solenoid valve 14 has a fluid connection to the source of fluid pressure to the release valve 18 and to the application valve 16 and is electrically connectable to a control module. The release pilot solenoid valve 14 is preferably of the three-way normally open type.

The release valve 18 has a fluid connection to an exhaust to atmosphere 26 and to the application valve 16 and to the release pilot solenoid valve 14 and to the braking device. The release valve 18 is preferably of the two-way normally open type. The release valve 18 is able to exhaust fluid pressure to atmosphere upon receipt of a fluid pressure signal from the release pilot solenoid valve 14 and resulting from an electrical signal from a control module to the release pilot solenoid valve thereby exhausting fluid pressure from the braking device (not shown) through a fluid connection to an exhaust to atmosphere 26.

The following is a description of the general operation cycle of this three-state magnet valve when used as a wheel slip control valve.

1. Application pilot solenoid 12 and release pilot solenoid 14 are deenergized by a control module. Source pressure then is allowed to enter the three-state magnet valve 10 through the application pilot solenoid 12 and pilots the application valve 16 open. The source pressure is allowed to flow to the brake cylinder (not shown) through the fluid connection 24 to a braking device.

2. The application pilot solenoid 12 is energized by a control module, allowing the pilot pressure from application valve 16 to exhaust through the application pilot solenoid 12 and its connection to an exhaust to atmosphere. The application valve 16, in turn, closes and holds the pressure steady at the brake cylinder (not shown).

3. The release pilot solenoid 14 is energized by a control module, allowing pilot pressure to be supplied to the release valve 18. This opens the release valve 18, which exhausts the brake cylinder (not shown) pressure through its connection to an exhaust to atmosphere. Energizing release pilot solenoid 14 also applies pilot pressure to the application valve 16. This pilot pressure holds the application valve 16 closed, keeping the source pressure from exhausting to atmosphere.

4. The release pilot solenoid 14 is energized by a control module and application pilot solenoid 12 is not energized by a control module. In this state, the pilot pressure would be holding the application valve 16 open initially, while the spring inside the release valve 18 is holding the release valve 18 closed. Then, after the control module energizes the release pilot solenoid 14, pilot pressure forces the application valve 16 closed and the release valve 18 open. This allows the pressure in the brake cylinder (not shown) to be exhausted through the release valve and its connection to an exhaust to atmosphere, while keeping the source pressure from exhausting to atmosphere.

States 3 and 4 produce the same result. Brake cylinder pressure exhausts to atmosphere and source pressure is not drained. Therefore, the valve has only three different states.

Figure 4:
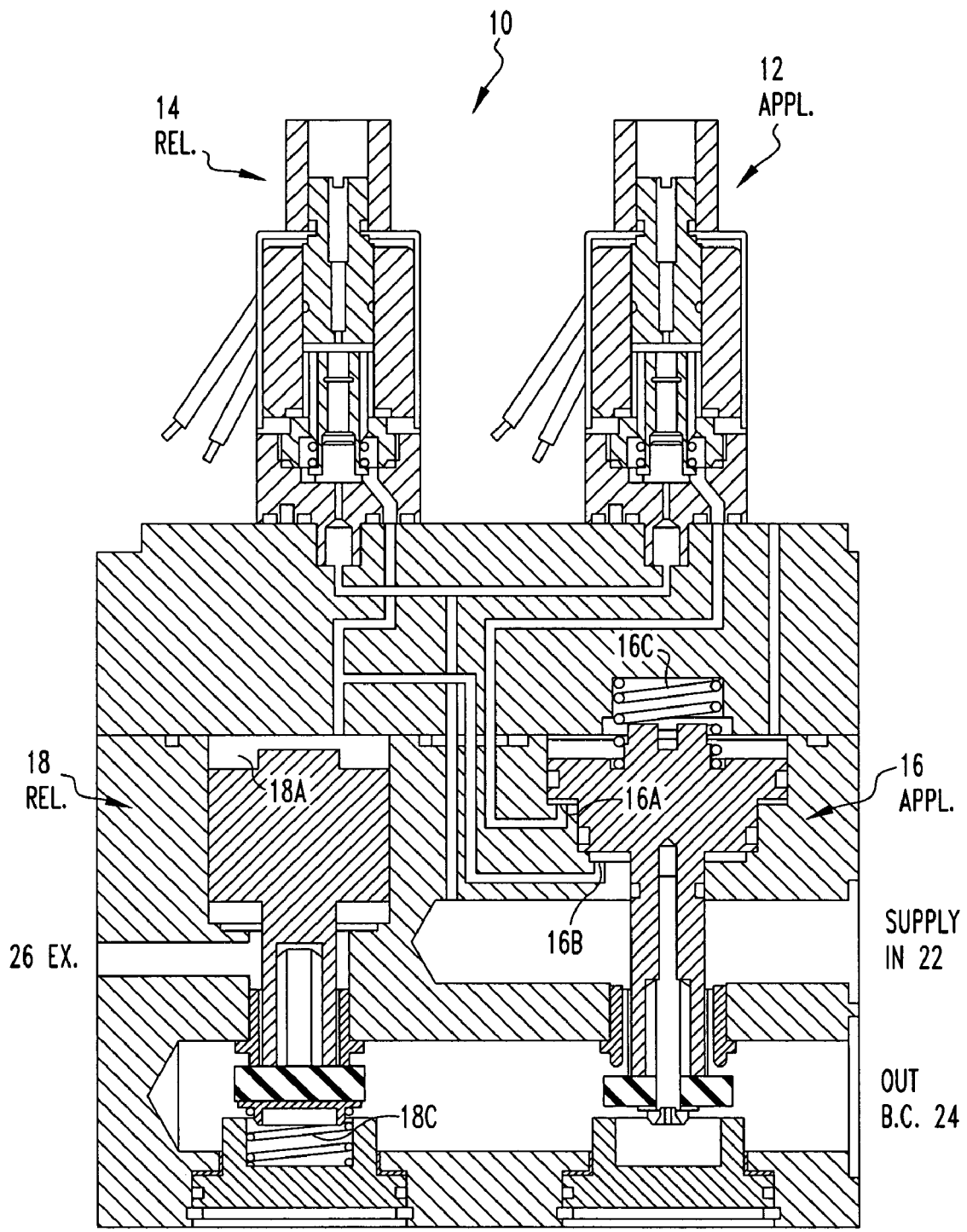
FIG. 4 is a section view through a valve according to another embodiment of the present invention.

FIG. 4 illustrates another embodiment of the present invention. This embodiment comprises two solenoid-operated valves, application solenoid 12 and release solenoid 14. The application valve 16 is biased normally closed by spring 16C transmitting supply pressure from supply port 22 to the brake cylinder port 24. When application solenoid 12 is energized, pilot pressure closes application valve 16 by applying pressure to the intermediate cylinder 16A.

Release valve 18 is biased normally closed by spring 18C preventing communication between the brake cylinder port 24 and the exhaust port 26. When release solenoid valve 14 is energized, it applies pressure to simultaneously close or maintain closed application valve 16 by applying pressure to lower cylinder 16B and to open valve 18 by applying pressure to upper cylinder 18A. Thus, if neither pilot solenoid valves are energized, the brakes are applied. If the application solenoid valve only is energized, the pressure in the brake cylinder is held. If the release solenoid only is or both the solenoid valves are energized, the brake cylinder is exhausted. Under no circumstances can the supply pressure pass directly through to the exhaust port.

While the present invention has been described by way of a detailed description of one embodiment, it will be readily apparent to those of ordinary skill in the art that various substitutions of equivalents may be affected without departing from the spirit or scope of the inventions set forth in the appended claims.

The invention claimed is:

1. A three-state magnet valve for control of fluid flow, said three-state magnet valve comprising:
   (a) an application solenoid pilot valve, a release solenoid pilot valve, an application valve and a release valve;
   (b) a means engageable with a source of fluid pressure for connecting said three-state magnet valve to said source of fluid pressure;
   (c) said application pilot solenoid valve having a fluid connection to said source of fluid pressure and to a first pilot port of said application valve and electrically connectable to a control module;
   (d) said application valve having a fluid connection to said source of fluid pressure and to a braking device, said application valve initiating a braking application upon receipt of a fluid signal at said first pilot port from said application pilot solenoid valve resulting from an electrical signal to said pilot application solenoid valve from said control module;
   (e) said release pilot solenoid valve having a fluid connection to said source of fluid pressure and to a second pilot port of said application valve and to a pilot port of said release valve and electrically connectable to said control module; and
   (f) said release valve having a fluid connection to an exhaust to atmosphere and to said braking device, said release valve exhausting fluid pressure from said braking device to atmosphere upon receipt of a fluid pressure signal from said release pilot solenoid valve to said pilot port of said release valve and said second pilot port of said application valve resulting from an electrical signal to said pilot release solenoid valve from such control module thereby exhausting fluid pressure from said braking device without connecting the source of pressure to said exhaust.

2. A three-state magnet valve according to claim 1, wherein said braking device is a brake cylinder.

3. A three-state magnet valve according to claim 1, wherein said means engageable with a source of fluid pressure for connecting said three-state magnet valve to said source of fluid pressure is a port.

4. A three-state magnet valve according to claim 1, wherein at least one of said solenoid valves is of the three-way, normally open type.

5. A three-state magnet valve according to claim 1, wherein at least one of said solenoid valves is of the three-way, normally closed type.

6. A three-state magnet valve according to claim 1, wherein at least one of said solenoid valves is of the two-way, normally open type.

7. A three-state magnet valve according to claim 1, wherein at least one of said solenoid valves is of the two-way, normally closed type.

* * * * *